Feb. 16, 1954

A. RAINES 2,669,325

ENERGY ABSORBER

Filed March 25, 1949

INVENTOR
Arnold Raines
BY
ATTORNEYS

Feb. 16, 1954
A. RAINES
2,669,325
ENERGY ABSORBER
Filed March 25, 1949
6 Sheets-Sheet 2
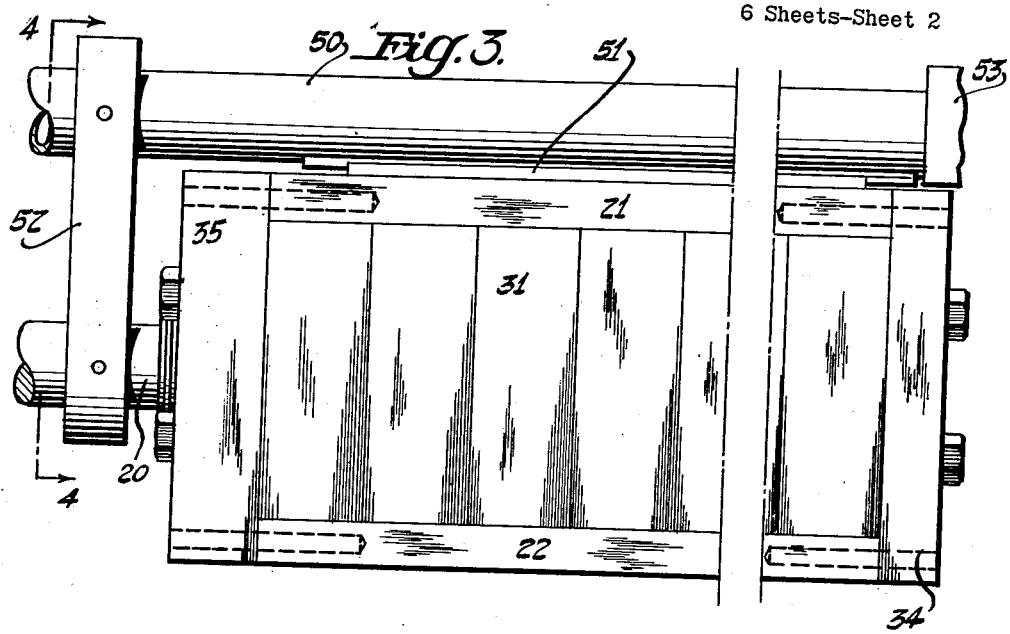
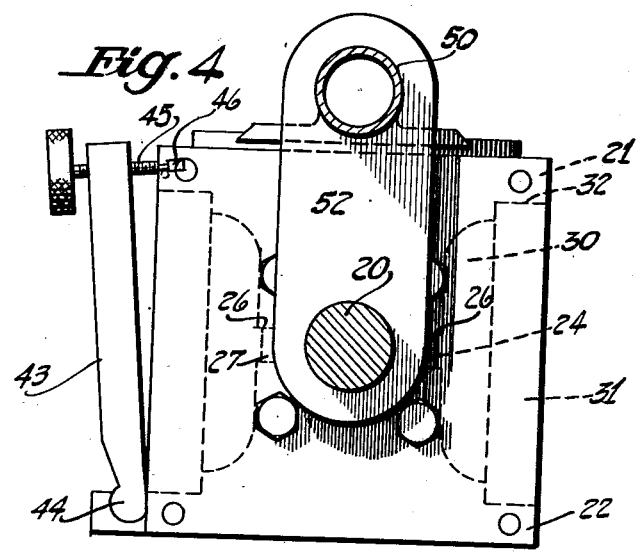
INVENTOR
*Arnold Raines*
BY
ATTORNEYS Feb. 16, 1954
A. RAINES
2,669,325
ENERGY ABSORBER
Filed March 25, 1949
6 Sheets-Sheet 3
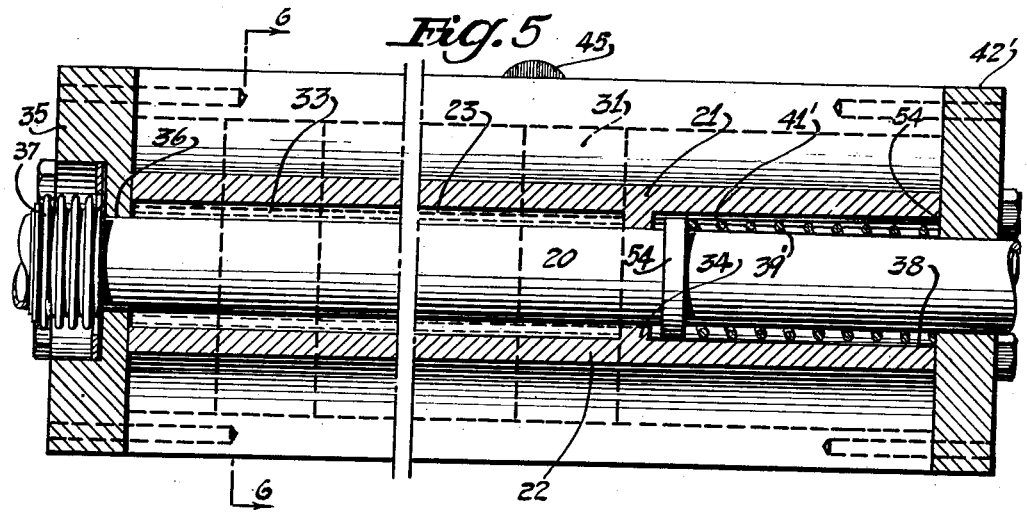
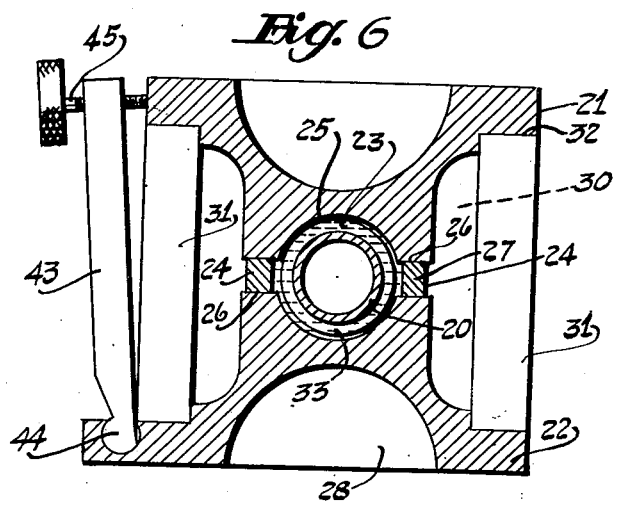
INVENTOR
*Arnold Raines*
BY
ATTORNEYS Feb. 16, 1954

A. RAINES 2,669,325

ENERGY ABSORBER

Filed March 25, 1949

INVENTOR
Arnold Raines
BY
ATTORNEYS

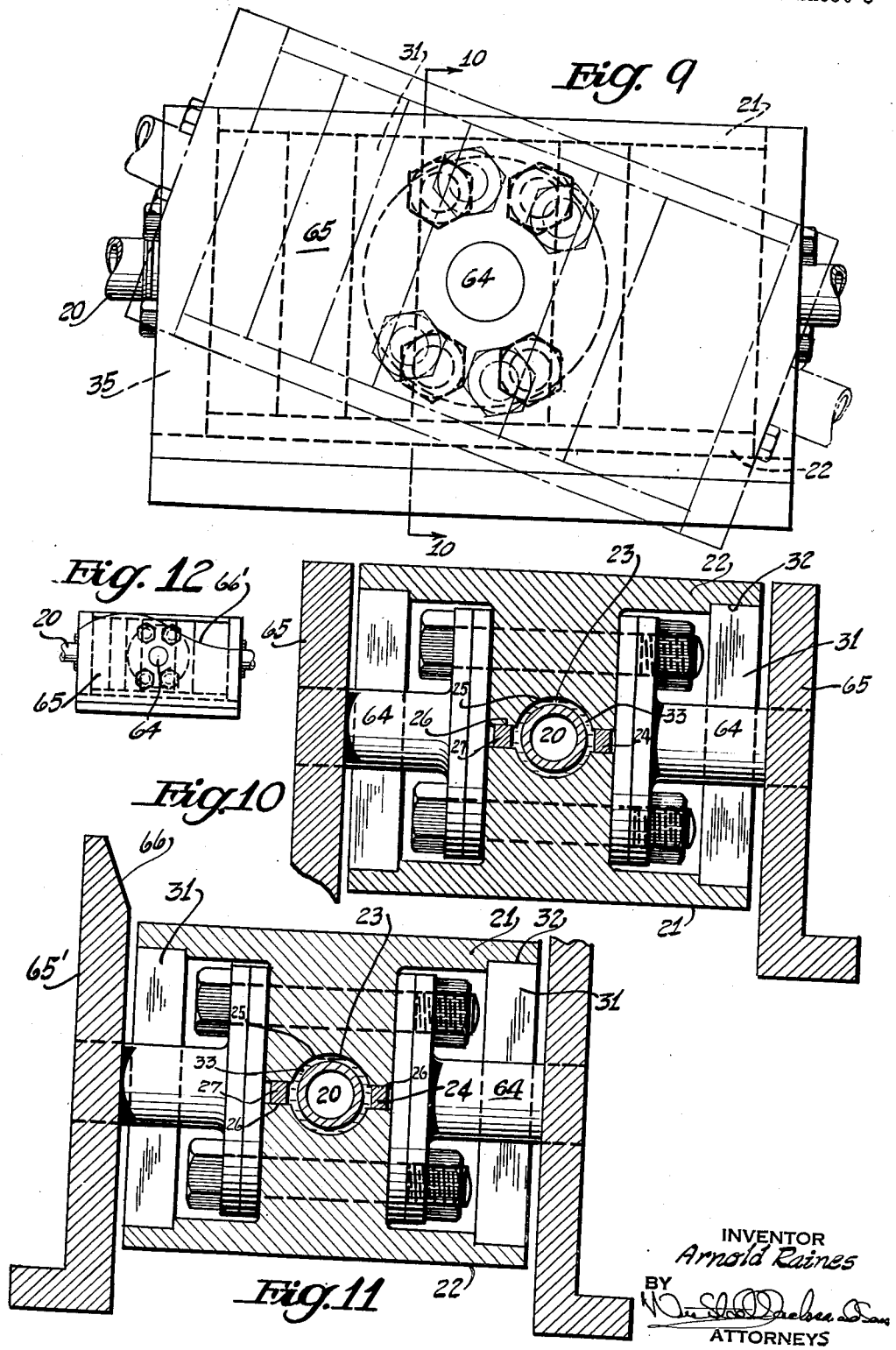

Feb. 16, 1954 A. RAINES 2,669,325
ENERGY ABSORBER
Filed March 25, 1949 6 Sheets-Sheet 6
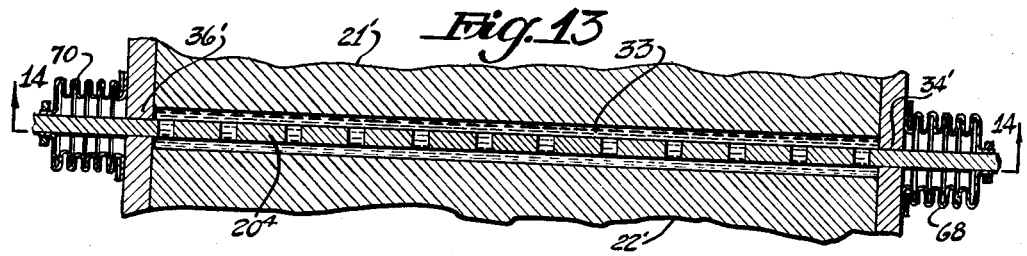
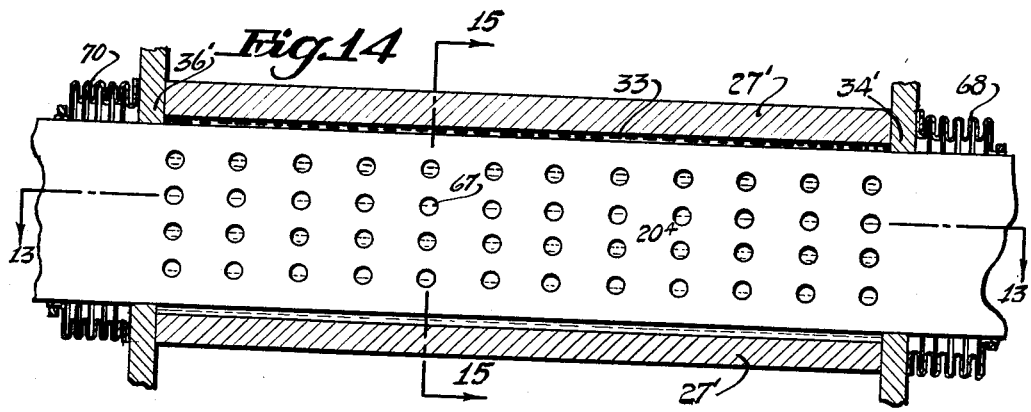
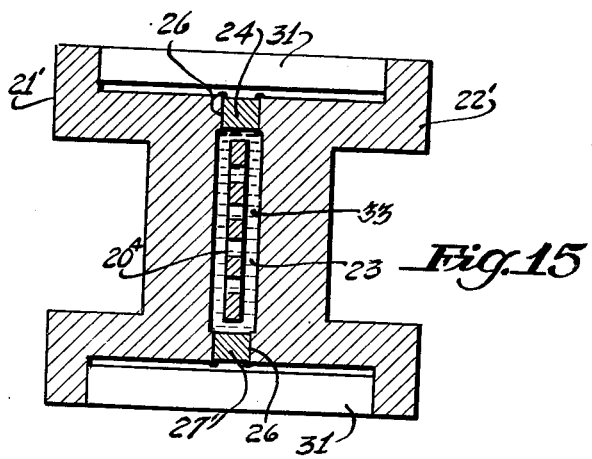
INVENTOR
*Arnold Raines*
BY
ATTORNEYS Patented Feb. 16, 1954

2,669,325

UNITED STATES PATENT OFFICE 2,669,325

ENERGY ABSORBER

Arnold Raines, Philadelphia, Pa.

Application March 25, 1949, Serial No. 83,360

7 Claims. (Cl. 188—1)

The present invention relates to energy absorbers such as recoil mechanisms, shock absorbers, shock or oleo struts or other suitable energy absorbing mechanism, and to processes relating to the same.

A purpose of the invention is to absorb the kinetic energy of a translating or reciprocating member such as the recoil rod of a gun, or the shock rod of a shock strut, by means of magnetizable fluid preferably acting between the rod and pole pieces surrounding the rod.

A further purpose is to vary the retardation force between the rod and the pole pieces as the rod translates.

A further purpose is to vary the flux applied across the pole pieces automatically as a recoil mechanism tips.

A further purpose is to make the operation of an energy absorber such as a recoil mechanism largely independent of refinements in machining, wear and corrosion.

A further purpose is to obtain a wider range of temperature in operation of energy absorbers such as recoil mechanisms, and to simplify the adjustment of the recoil for change in power charge, or change in operating conditions such as temperature.

A further purpose is to decrease the weight of an energy absorber.

A further purpose is to permit the construction of an energy absorber of variant size from a large number of standard parts.

A further purpose is to construct the recoil rod of any suitable material, preferably an electrical conductor and most desirably a ferromagnetic electrical conductor.

Further purposes appear in the specification and in the claims.

In the drawings I have chosen to illustrate a few only of the many embodiments in which my invention may appear, selecting the forms shown from the standpoints of convenience in operation, satisfactory illustration and clear demonstration of the principles involved.

Figure 3 is a fragmentary diagrammatic side elevation of a variant form of the energy absorber of the invention.

Figure 4 is a section on the line 4—4 of Figure 3.

Figure 5 is a diagrammatic fragmentary axial section of a still further variant of the invention.

Figure 6 is a section on the line 6—6 of Figure 5.

Figure 9 is a fragmentary diagrammatic side elevation of a variation in the shunt.

Figure 10 is a section on the line 10—10 of Figure 9.

Figure 11 is a section corresponding to Figure 10 but illustrating a further variation.

Figure 12 is a side elevation to reduced scale showing a variation in Figure 9.

Figure 13 is a longitudinal fragmentary section of a variation on the line 13—13 of Figure 14.

Figure 14 is a longitudinal fragmentary section of Figure 13 on the line 14—14.

Figure 15 is a transverse section of Figure 14 on the line 15—15.

Figure 1:
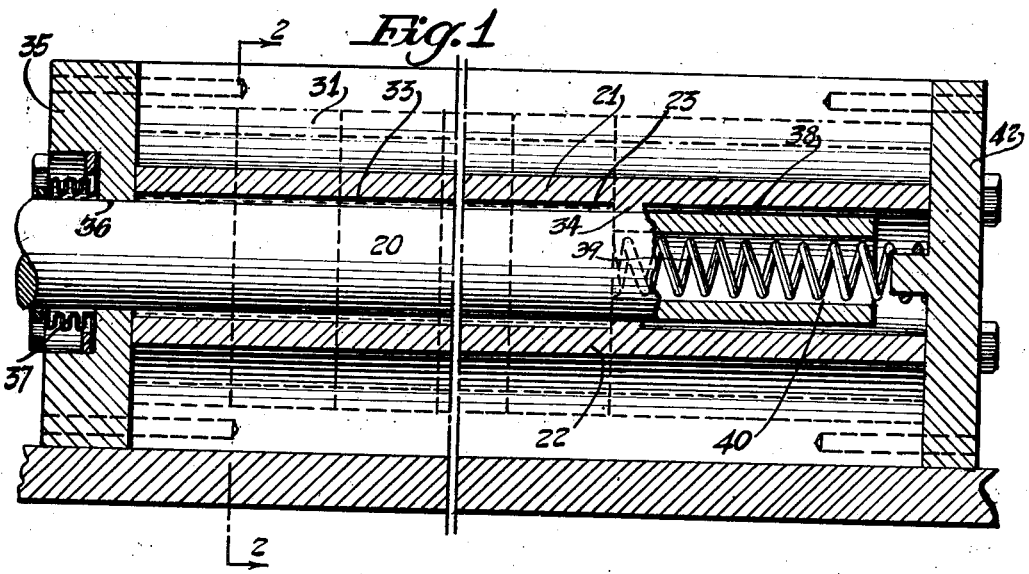
Figure 1 is a diagrammatic, fragmentary axial section of an energy absorber to which the invention has been applied.

Describing in illustration but not in limitation and referring to the drawings:

The absorption of kinetic energy in translating parts such as reciprocating rods or the like has presented a serious problem, for example in gun recoil mechanisms, shock struts or oleo struts of airplanes and in buffers of railways, elevators and numerous other types of equipment. In larger mechanisms, hydraulic equipment is employed, usually in connection with the compression of a spring or the compression of a gas.

One of the most widely used prior art devices has been the hydropneumatic recoil mechanism employed on artillery. While this device, when properly constructed, may give good service, it has presented many difficulties. For efficient operation, it is necessary to employ the greatest refinement in machining finish, some of the surfaces usually being lapped and honed at great expense. Wear of metallic parts and packings becomes a serious factor in the operation. During storage and periods of inactivity, corrosion is very likely to occur and unusual precautions, including in some cases gymnastication, have been necessary to prevent difficulty.

Hydropneumatic recoil mechanisms have been limited in temperature range, and very prone to produce short recoil at low operating temperatures and long recoil at high operating temperatures, due to the change in viscosity of the oil.

Hydropneumatic recoil mechanisms have generally not been interchangeable, and few if any standard parts have been employed, it being necessary to build a different recoil mechanism for each weapon or group of weapons having the same energy of recoil.

Withal, the various prior art energy absorbers, especially hydropneumatic recoil mechanisms, have been cumbersome and heavy, resulting in a distinct demand to eliminate this feature and produce lighter weapons and machinery. At great expense from the standpoint of ammunition supply, this has been accomplished by recoilless weapons, but such weapons cause an increased problem of ammunition procurement.

The present invention is concerned with an energy absorber which overcomes many of these difficulties. The device of the invention does not depend upon refinements of machining finish, and even if wear should occur it will not make substantial difference in the operation of the device, as compensation can readily be made by adjustment, if necessary. The device can be stored indefinitely and is not sensitive to damage by corrosion.

The energy absorber of the present invention is much less sensitive to temperature variation than the hydropneumatic type, and can be operated at high or low atmospheric temperatures without difficulty. In addition, it is possible to compensate automatically for temperature changes by using shunts having a permeability which is a proper function of temperature.

Energy absorbers according to the present invention can be built up from standard components very readily and a wide range of capabilities are possible from a given size. A particularly valuable feature of the invention is that the weight is greatly reduced. Present indications are that in the recoil mechanism for a large cannon, the weight and size can both be decreased to about one-fourth that of prior art devices.

The invention operates upon the principle of magnetic fluid (which is of course a mixture). A magnetic circuit transmits flux across a space which contains magnetic particles suspended in a liquid or plastic fluid. The resistance of the magnetic fluid to the motion of any member along it or through it varies with the magnetic flux in the magnetic circuit.

By placing the recoil rod or other member against the magnetic fluid and in position to move along it, it is possible to retard the motion and absorb the energy, which will largely be dissipated as heat.

The recoil rod or other recoiling member will preferably form part of the magnetic circuit, and therefore should most desirably be ferromagnetic in order to form part of the magnetic circuit, and electrically conducting so as to dissipate energy as eddy currents during recoil. However, the rod or other recoiling member need not be ferromagnetic where it is not part of the magnetic circuit, but should still preferably be electrically conducting. Even if the recoil rod were not even electrically conducting, however, it would retard to some extent due to the drag of the plastic magnetic fluid, which undergoes shear and distortion as the rod recoils.

As later explained, the magnetic field may be set up by field coils, but it is preferable to use permanent magnets arranged in one or more banks across the gap between pole pieces. The strength of the magnetic field between the pole pieces can be adjusted by providing a variable magnetic shunt.

Figure 2:
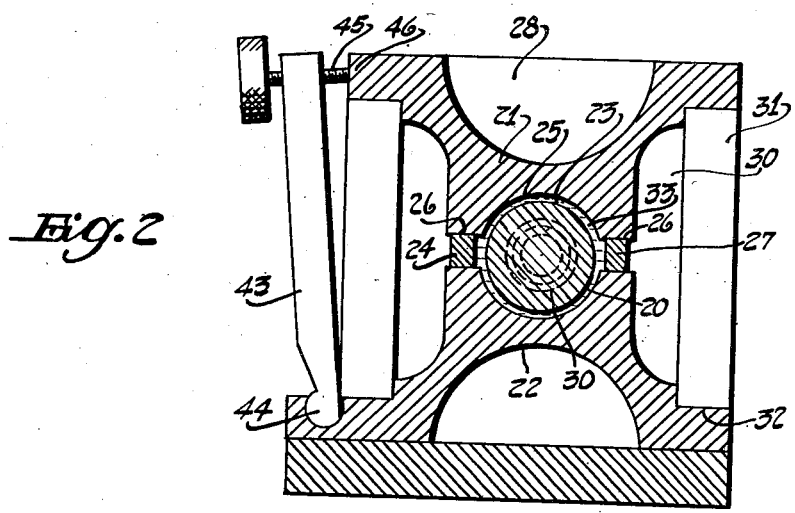
Figure 2 is a section on the line 2—2 of Figure 1.

Considering first the forms of Figures 1 and 2, a member 20 is provided which has acquired energy of motion, and is translating or reciprocating from the left to the right in Figure 1. This member may be of any desired elongated form, such as a rod or tube, but since it is common in artillery to designate the main element of a recoil mechanism as a recoil rod, this element is generally referred to herein as a recoil rod, whether it be round or of some other cross section, and whether it be solid or hollow. The member 20 may for example be the piston of a shock strut or oleo strut, in which case Figures 1 and 2 will show such a strut, or it may be the piston of a bumper, in which case Figures 1 and 2 illustrate such a mechanism. It will be evident that the recoil rod may for example be in prolongation of the breech of the gun tube, in which case the gun will be in continuation of the rod 20 to the left of Figure 1, the breech being interposed between the gun tube and the recoil rod, and being charged from the side.

The recoil rod is preferably made of ferromagnetic electrically conducting material such as soft iron, or soft steel or mild steel or heat-treated constructional steel, but less desirably it may be made of nonferromagnetic electrically conducting metal such as bronze, austenitic stainless steel or Monel. Still less desirably, it may be made of nonferromagnetic nonelectrically conducting material such as glass or phenol-formaldehyde plastic, provided the load and shock are not too great in the particular installation.

Pole pieces 21 and 22, made of ferromagnetic material, preferably soft iron or mild steel, extend along and preferably around the rod 20, in spaced relation from the rod at 23 and in spaced relation from one another at 24. Each pole piece desirably generally conforms to the cross section of the rod, and in this case where the rod is of circular cross section the inner central portion of each pole piece is substantially semi-cylindrical at 25, thus effectively forming a chamber or cylinder around the rod. As it is desired to have an air gap at 24 between the pole faces 26, but to obtain a liquid tight seal, spacers 27 are interposed between the pole faces, such spacers consisting of a nonmagnetic material such as brass, bronze or beryllium copper. In order to assist in making the cylinder liquid tight, the non-magnetic spacers 27 may be brazed, silver soldered or otherwise suitably fastened to the pole pieces.

The pole pieces are conveniently longitudinally recessed at 28 in line with the axis, to reduce weight and permit clearance for a gun tube or other recoil member which may be positioned laterally to the control rod, as is common in some recoil mechanisms. This space can also be used for a temperature bath for test purposes. The pole pieces are likewise recessed at 30 at the sides to provide for insertion of the source of magnetism. This preferably takes the form of a plurality of permanent magnets 31 lined up side by side with their similar poles adjoining. The magnets will preferably be of high strength magnetic alloy such as Alnico having a composition of 10 to 12% aluminum, 17 to 20% nickel, 5 to 12.5% cobalt, balance essentially iron, with optional inclusion of 0 to 6% copper in the alloy if it is sintered. The pole pieces are formed with sockets 32 to receive the magnets.

It will be evident that in the forms shown the magnets are placed in two banks on opposite sides of the recoil rod 20, but it will be understood as later explained that the source of magnetism may be located in one bank or any number of banks as desired.

Interposed in the space 23 between the recoil rod and the pole pieces is a ferromagnetic fluid 33. This may be any one of the known magnetizable fluids employed in clutches and the like. The ferromagnetic fluid will preferably consist of an oily vehicle, such as hydraulic oil or a lubricating mineral oil such as S. A. E. 20 or S. A. E. 30 or a grease such as a calcium, sodium, potassium or lithium stearate or palmitate incorporated with any such mineral oil.

For most purposes and especially where a wide temperature range is required, it is preferred to use a liquid or plastic fluid having a flatter viscosity curve, such as silicone oil or grease. An example is dimethyl silicone polymer as described in J. E. Brophy, R. O. Millitz and W. A. Zisman, Transactions of the American Society Mechanical Engineers, volume 68, page 355 (1946) and V. G. Fitzsimmons, D. L. Pickett and R. O. Millitz, ibid, volume 68, page 361 (1946).

Suitably distributed or dispersed in the oil are particles of a ferromagnetic material such as soft iron or steel having a small enough size to function as a liquid or semi-fluid. A particle size of 8 to 10 microns is preferred, but particles may be as small as one-half micron or smaller and may be as large as 80 microns or larger. The mixture of metal particles and oil or grease must function as a plastic mass.

The oil or grease vehicle may and preferably will comprise only a small part of the total weight of the magnetic fluid, being preferably about 10% and suitably ranging between 2% and 50% depending on the installation.

Suitable means will be employed to prevent leakage of the magnetic fluid. In this case the rear of the fluid space is closed by a guide 34, which may or may not include a packing.

Likewise the front is provided with a header 35 having a guiding opening 36 through which the recoil rod passes and which may or may not be packed. Instead of using a packing, it is preferable to seal the liquid at the front by a boot 37, preferably in the form of a resilient metallic bellows connected at one end to the front plate 35 and at the other end to the recoil rod.

The device of the invention may or may not include counter energy storage means for restoring it to initial position. In the case of a recoil mechanism, however, and of most buffers and shock absorbers, it is preferable to have the counter recoil mechanism included in a self contained unit. In the form of Figures 1 and 2 the mechanism at its rear end includes a counter-recoil chamber 38 free from magnetic fluid and containing a counter recoil spring 39 in a well 40 at the rear of the recoil rod. The rear end of the spring 39 engages an abutment plate 42 bolted or otherwise fastened on the rear of the poles, and preferably consisting of a nonferromagnetic metal or shimmed from the poles by nonferromagnetic metal. No attempt has been made in the present invention to show refinements such as limiting buffers which are well known in the art.

In order to adjust the effective viscosity of the magnetic fluid, it is important to be able to adjust the strength of the magnetic fluid. A magnetic shunt is provided across the pole pieces and effectively across one bank of magnets, consisting of a plate 43 of soft iron or steel or other magnetically susceptible material, which sockets at 44 in one pole piece and is adjustably mounted by an adjustment screw 45, preferably of nonmagnetic metal, which permits changing the air gap between one pole piece and the shunt. The adjustment screw preferably threads through the shunt and has a socket engagement at 46 in the pole piece (best seen in Figure 4).

In some cases it may be desirable to vary the magnetic field directly or inversely with temperature to provide for or compensate for changes in the properties of the magnetic fluid with temperature. For example, where the viscosity of the magnetic fluid increases with decrease in temperature due to increase in the viscosity of the oil or grease, a shunt may be provided which increases in permeability with decrease in temperature so that the apparent or magnetic viscosity of the fluid will reduce as the inherent viscosity due to the oil or grease increases, and at the same rate. Various alloys having positive or negative changes in permeability with temperature are well known and may be used, a typical example being the temperature compensating permeability alloy containing 28 to 33% nickel, balance iron, produced commercially by Carpenter Steel Company.

The device of Figures 1 and 2 in inactive position will have the rod 20 positioned further to the left than shown in Figure 1. When energy is to be absorbed and the rod begins to move toward the right, the magnetic flux from the permanent magnets will pass across the pole pieces through the magnetic fluid and, where the recoil rod is ferromagnetic, will return through the recoil rod, causing the magnetic fluid to remain highly viscous.

The operation which takes place during recoil will vary depending upon whether or not the recoil rod is electrically conducting. If the recoil rod is electrically conducting, as it will always be in the preferred embodiment, the rod will constitute an electrical conductor moving in a magnetic field during recoil, and eddy currents will be set up, incident to the creation of forces which oppose further motion. The eddy currents will expand themselves in heat, thus dissipating energy of recoil. Regardless of whether or not the recoil rod is electrically conducting, there will be a fluid or plastic action by the magnetic fluid in opposing recoil, since the magnetic fluid will be in a highly viscous condition as the rod seeks to slide with one surface in contact with the fluid. The viscosity of the fluid in many cases will be that of a plastic mass, and it will be necessary for the rod to do work on the fluid by fluid or plastic shear and by fluid or plastic deformation, thus generating heat and absorbing kinetic energy as the rod recoils.

In order to change the force required to overcome the viscosity of the liquid, it is merely necessary to adjust the magnetic shunt, as the effective viscosity of the magnetic fluid changes with the flux density.

The clearance between the recoil rod and the wall of the cylinder may vary with the particular design, but it has been found that in many cases the clearance can be quite wide, for example 0.020 inch.

In the actual device as shown in Figure 1, the wide clearances make refinements in machining finish unnecessary, and there will be no appreciable difference in recoiling energy due to roughness or smoothness of surfaces. Wear also is not a factor, since any differences will make only a small change in total air gap and can be compensated for readily, if required, by adjustment of the shunt. Considerable corrosion can occur on the interior of the cylinder, on the rod or any other surface, without interfering with the functioning of the device.

Calculations indicate that the mechanism as shown in Figures 1 and 2 has only about one-fourth the weight and will occupy only about one-fourth the space of comparable hydropneumatic recoil mechanisms.

The device is widely applicable to different sizes or calibers. The pole pieces, magnets and other components can readily be made up in units, becoming standard parts, and the units can be made interchangeable except for example as to adaptors or as to recoil rods.

The feature of applying the recoil rod as an extension on the rear of the gun as indicated in Figures 1 and 2 will in most cases be less applicable to guns of larger caliber, and in such weapons it may be preferable to adopt the common practice of mounting the gun tube above or below the recoil rod and interconnecting the gun tube and the recoil rod by a yoke or the like. This arrangement is suggested by Figures 3 and 4, in which the primary recoiling member 50, which may be a gun tube, a shock absorber, plunger or the like, is mounted on slides 51 and interconnected by a yoke 52 to the recoil rod 20 which operates in the recoil mechanism as above described. The primary recoiling member 50, if a gun, will be provided with a breech 53.

It may be preferable in many instances to extend the primary recoiling member clear through the recoil mechanism, locating the recoil mechanism directly around the main recoil member. This is shown by Figures 5 and 6, in which the control rod 20 is also the gun tube, which will have a breech not shown over at the right in Figure 5 and will fire through the interior of the recoil mechanism. The member 20 in Figures 5 and 6 may likewise be a strut or plunger of some other mechanism.

In order to permit the recoil rod to extend clear through the recoil mechanism, the counter recoil spring 39' surrounds the rod in the counter recoil chamber 38, the spring acting between a shoulder or ring 54 formed from or secured to the rod and a base plate 42', suitably fastened to the pole pieces as by bolts and preferably consisting of non-ferrous metal or spaced from the poles by non-ferrous shims.

Figure 7:
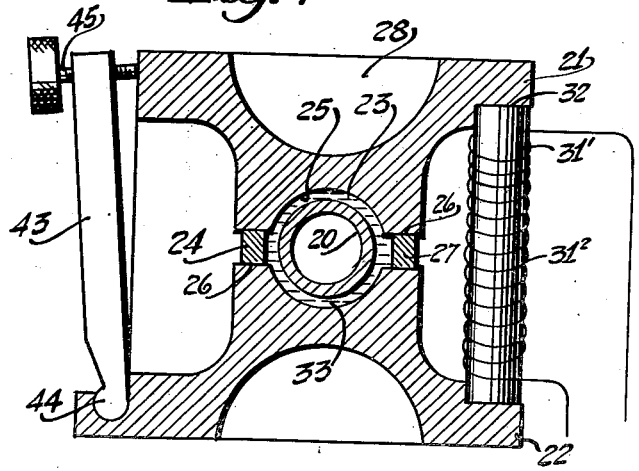
Figure 7 is a section corresponding to Figure 2, illustrating a further variation.

It may in some cases be preferable to obtain the magnetic field from electromagnets and in Figure 7, instead of permanent magnets, a series of soft iron cores 31' are provided surrounded by coils 31², energized by direct or alternate current as desired. In order to illustrate that the source of magnetism may be located all at one side, the electromagnets in Figure 7 are illustrated as being positioned at the side opposite to the shunt, although it will be understood that any desired number of groups of electromagnets or permanent magnets can be employed, depending upon the number of pole pieces and gaps between pole pieces.

Figure 8:
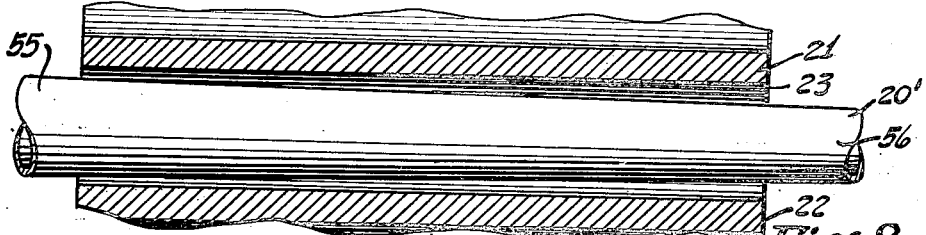
Figures 8, 8a and 8b are fragmentary axial diagrams showing different relationships of cross section between the rod and the pole pieces, omitting the magnetic fluid between the two.
Figure 8A:
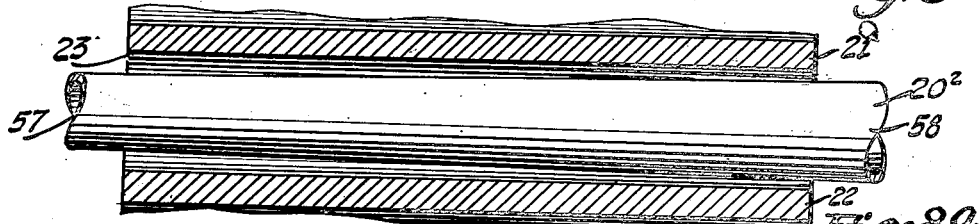
Figure 8B:
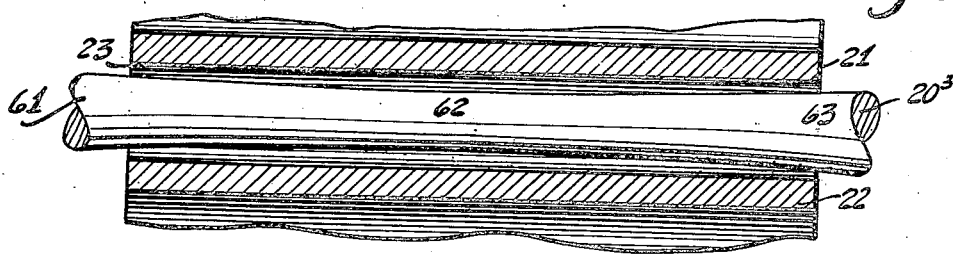

In the forms previously described, the recoil rod is illustrated as a right circular cylinder, but it will be evident that in some cases there may be advantages in making the recoil rod function as a control rod to vary the rate of energy absorption in recoil at various stages of recoiling. To illustrate this, Figures 8, 8ª and 8ᵇ show different forms. In all of these forms, the cylinder 23 is a right circular cylinder. In Figure 8, the recoil rod 20' is a circular tapering cone frustrum larger at the forward end 55 and smaller at the rearward end 56. In Figure 8ª the recoil rod 20² is a circular tapering cone frustrum smaller at the forward end 57 and larger at the rearward end 60. In Figure 8ᵇ the recoil rod 20³ is circular in cross section, but varies progressively from a large diameter at 61 at the forward end through a small diameter at 62 near the middle to a large diameter at 63 near the rearward end. In all of these forms the rods will preferably be right circular cylinders where they pass through the guides at the ends of the cylinder to the right and left of the positions shown.

All of these forms accomplish variations in the gap between the cylinder and the recoil rod or the effective thickness of the magnetic fluid at different points along the rod as it recoils. Of course the views exaggerate the amount of taper required for most installations.

Thus it will be seen that in all these forms the recoil rod effectively functions as the control rod.

In some cases it may be desirable to vary the energy absorbed in recoil, depending on the elevation of the gun. This is shown in Figures 9 and 10, where the tipping parts constructed essentially as shown in any one of the previous views are mounted on trunnions 64 bolted to the poles and extending through spaces where permanent magnets are omitted. The trunnions are desirably of nonferrous metal such as bronze or are prevented from magnetic short circuiting by nonferrous bolts and shims. The trunnions pivot in ferromagnetic shunt supports 65 which are located close to the pole pieces, but change their effective area in intimate contact with the pole pieces and therefore their effective shunt as the gun elevates. The shunt supports are mounted on any suitable carriage or mount.

Figure 11 shows a form in which the shunts 65' have portions 66 more widely spaced from the pole pieces located above the position of the shunt which is normally adjacent the pole pieces. The spaced portions 66 come into adjacent position when the tipping parts elevate. Thus in this form the effective area of the shunt does not change, but the air gap increases as the tipping parts elevate, in either case increasing the reluctance of the magnetic path.

In some cases the area of the shunt may be distributed according to some law which increases or decreases the reluctance of the magnetic circuit as required when the parts tip, as for example due to elevation of the gun. Figure 12 shows shunts 65 having a curved upper edge 66' which conforms to the desired law.

As already noted, the recoil rod need not be circular and it need not be ferromagnetic. In the form of Figures 13 to 15 inclusive, the recoil rod 20⁴ is rectangular in cross section and has perforations 67 extending from the sides and desirably through the rod in contact with the magnetic fluid. The rod is suitably of a nonferromagnetic electrical conductor such as bronze, beryllium copper or Monel. Opposed ferromagnetic poles 21' and 22' are spaced by nonferromagnetic gap material 27', across which magnets 31 extend. A space of rectangular cross section receives the magnetic fluid 23 surrounding the rod, the pole faces being suitably close to the rod on either side. The rod is guided by guides 36' and 34' at the ends, and packings may or may not be employed at the guides. Metallic bellows 68 and 70 seal beyond the guides between the poles and the rod. A suitable shunt, not shown, is provided as in the other forms.

In recoil from left to right in Figures 13 and 14, there is substantial shear of the plastic magnetic fluid, as well as eddy current heating. The fact that the magnetic fluid extends through the openings 67 in the recoil rod reduces the effective air gap across the rod, which is important since this rod is not ferromagnetic.

It will be evident of course that while the recoil rod 20⁴ may be merely electrically conducting, in the preferred embodiment it will also be ferromagnetic.

It will be evident that by this invention it is possible to simplify greatly the production and increase the mobility of recoil mechanisms and other energy absorbers.

In view of my invention and disclosure variations and modifications to meet individual whim or particular need will doubtless become evident to others skilled in the art, to obtain all or part of the benefits of my invention without copying the process and structure shown, and I, therefore, claim all such insofar as they fall within the reasonable spirit and scope of my claims.

Having thus described my invention what I claim as new and desire to secure by Letters Patent is:

1. In an energy absorber, a rod adapted to translate along a path and having kinetic energy to be absorbed, a pair of opposed ferromagnetic pole pieces extending along the rod and along its path of translation, the rod being between the pole pieces, and there being longitudinally extending gaps between the pole pieces, nonmagnetic means preventing escape of fluid between the gaps and forming an enclosure with the pole pieces around the rod, a fluid mixture including ferromagnetic particles in the enclosure and a magnet establishing a magnetic field between the pole pieces.

2. In an energy absorber, a ferromagnetic rod adapted to translate along a path and having kinetic energy to be absorbed, a pair of opposed ferromagnetic pole pieces extending along the rod and along its path of translation, the rod being between the pole pieces, and there being longitudinally extending gaps between the pole pieces, nonmagnetic means preventing escape of fluid between the gaps and forming an enclosure with the pole pieces around the rod, a fluid mixture including ferromagnetic particles in the enclosure and a magnet establishing a magnetic field between the pole pieces.

3. In an energy absorber, a rod adapted to translate along a path and having kinetic energy to be absorbed, a pair of opposed ferromagnetic pole pieces extending along the rod and along its path of translation, the rod being between the pole pieces, and there being longitudinally extending gaps between the pole pieces, nonmagnetic means preventing escape of fluid between the gaps and forming an enclosure with the pole pieces around the rod, a fluid mixture including ferromagnetic particles in the enclosure, a magnet establishing a magnetic field across the pole pieces and a magnetic shunt across the pole pieces.

4. In an energy absorber, a rod adapted to translate along a path and having kinetic energy to be absorbed, a pair of opposed ferromagnetic pole pieces extending along the rod and along its path of translation, the rod being between the pole pieces, and there being longitudinally extending gaps between the pole pieces, nonmagnetic means preventing escape of fluid between the gaps and forming an enclosure with the pole pieces around the rod, a fluid mixture including ferromagnetic particles in the enclosure, a magnet establishing a magnetic field across the pole pieces, a magnetic shunt across the pole pieces and an adjustment for the reluctance of the magnetic shunt.

5. In an energy absorber, a ferromagnetic rod of circular cross section adapted to translate and having kinetic energy to be absorbed, ferromagnetic pole pieces, one on each side of the rod, having interior surfaces curved conforming to the curvature of the rod and spaced from the rod and having gaps extending longitudinally of the rod between the pole pieces, nonmagnetic means closing the gaps against leakage and forming an enclosure between the rod and the pole pieces, a ferromagnetic fluid mixture in the enclosure, permanent magnets extending across the gaps between the pole pieces, a ferromagnetic shunt across some of the magnets and an adjustment for the reluctance of the shunt.

6. In an energy absorber, an electrically conducting rod adapted to translate and having kinetic energy to be absorbed, the rod having a cross section which varies in accordance with a predetermined program, ferromagnetic pole pieces on opposite sides of the rod surrounding the rod and having gaps on opposite sides which extend longitudinally of the rod, nonmagnetic means closing the gaps in the pole pieces and forming an enclosure between the rod and the pole pieces, a fluid mixture including ferromagnetic particles in the enclosure and a magnet connected to the pole pieces and establishing a magnetic field between the pole pieces.

7. In an energy absorber, a translating electrically conducting element having kinetic energy to be absorbed, a relatively stationary ferromagnetic element adjacent the path of translation and having a longitudinally extending gap, nonmagnetic means closing the gap against leakage of fluid and forming with the ferromagnetic element an enclosure around the translating element, a fluid mixture in the enclosure including ferromagnetic particles, a magnet passing flux through the ferromagnetic element and the fluid mixture and a ferromagnetic shunt for the magnet including material which has corrective change in permeability with change in temperature.

ARNOLD RAINES.

References Cited in the file of this patent

UNITED STATES PATENTS

| Number | Name | Date |
|---|---|---|
| 397,027 | Schneider | Jan 29, 1889 |
| 436,375 | Nordenfelt | Sept. 16, 1890 |
| 829,939 | Behr | Sept. 4, 1906 |
| 1,114,691 | Herz | Oct. 20, 1914 |
| 1,137,123 | Fernanzo | Apr. 27, 1915 |
| 1,260,405 | Krussell | Mar. 26, 1918 |
| 1,358,386 | Moriarty | Nov. 9, 1920 |
| 1,362,990 | Gilman | Dec. 21, 1920 |
| 1,363,203 | Gartin | Dec. 21, 1920 |
| 1,437,291 | Corporon | Nov. 28, 1922 |
| 1,539,196 | Litten | May 26, 1926 |
| 1,671,658 | Travers | May 29, 1928 |
| 1,783,560 | Eisemann | Jan. 2, 1930 |
| 1,922,080 | Driggs, Jr. | Aug. 15, 1933 |
| 2,106,882 | Betz | Feb. 1, 1938 |
| 2,125,617 | Niemann | Aug. 2, 1938 |
| 2,184,766 | Harding | Dec. 26, 1939 |
| 2,417,850 | Winslow | Mar. 25, 1947 |
| 2,502,628 | Maynard | Apr. 4, 1950 |

FOREIGN PATENTS

| Number | Country | Date |
|---|---|---|
| 485,592 | Belgium | Nov. 13, 1948 |
| 19,344 | Great Britain | 1912 |
| 22,238 | Great Britain | 1894 |
| 562,622 | Great Britain | 1944 |
| 399,700 | France | Apr. 29, 1909 |

OTHER REFERENCES

Business Week, December 18, 1948, pages 48 to 50, Magnetized Iron-Oil Mixes in New Jobs. Copy in Div. 68, U. S. Patent Office.

Publication: The Magnetic Fluid Clutch, by Jacob Rabinow, National Bureau of Standards, AIEE Technical Paper 48-238, Made available for printing September 3, 1948. Copy in Division 68.